United States Patent [19]

Rudden

[11] Patent Number: 5,496,572
[45] Date of Patent: Mar. 5, 1996

[54] RUMINANT FEEDSTUFFS AND THEIR PRODUCTION

[75] Inventor: Conor Rudden, Eire, Ireland

[73] Assignee: Church & Dwight Co., Inc., Princeton, N.J.

[21] Appl. No.: 384,615

[22] Filed: Feb. 6, 1995

Related U.S. Application Data

[63] Continuation of Ser. No. 89,563, Jul. 12, 1993, abandoned, which is a continuation-in-part of Ser. No. 924,493, Aug. 4, 1992.

[51] Int. Cl.⁶ .................................................. A23K 1/00
[52] U.S. Cl. ........................... 426/74; 426/601; 426/623; 426/635
[58] Field of Search .................... 210/635, 626, 210/42, 657, 636, 647; 426/74, 601, 623

[56] References Cited

U.S. PATENT DOCUMENTS

| | | | |
|---|---|---|---|
| 3,010,828 | 11/1961 | Patterson et al. | 426/635 |
| 3,051,571 | 8/1962 | Pergament | 99/2 |
| 4,232,046 | 11/1980 | Deyoe et al. | 426/635 X |
| 4,259,357 | 3/1981 | Van Kranenburg | 426/42 |
| 4,307,027 | 12/1981 | Borzelli et al. | 260/413 |
| 4,642,317 | 2/1987 | Palmquist et al. | 514/558 |
| 4,729,896 | 3/1988 | Sawhill | 426/2 |
| 4,826,694 | 5/1989 | McAskie | 426/74 |
| 4,853,233 | 8/1989 | McAskie | 426/601 X |
| 4,868,001 | 9/1989 | Maruta | 426/623 |
| 4,937,082 | 6/1990 | Sawhill | 426/69 |
| 5,215,768 | 6/1993 | Vinci et al. | 426/74 |
| 5,236,723 | 8/1993 | Lajoie et al. | 426/72 |

FOREIGN PATENT DOCUMENTS

| | | |
|---|---|---|
| 0163395 | 12/1985 | European Pat. Off. . |
| 0280810 | 9/1988 | European Pat. Off. . |
| 0421879 | 4/1991 | European Pat. Off. . |
| 2113521 | 10/1985 | United Kingdom . |
| WO9310672 | 6/1993 | WIPO . |
| WO9310671 | 6/1993 | WIPO . |

OTHER PUBLICATIONS

Copy of International Search Report (PCT/GB73/01499).
The British Journal of Nutrition vol. 16, No. 2, 1962, pp. 237–243.

*Primary Examiner*—Frank Spear
*Attorney, Agent, or Firm*—Charles B. Barris

[57] ABSTRACT

A ruminant feedstuff comprises, in admixture, one or more edible, water-insoluble calcium or magnesium fatty acid salts and animal or vegetable protein nutritional material, the protein material having been converted during formation of the fatty acid salt into a form which is substantially non-degradable in the rumen but which is digestible in the lower gut. This feedstuff may be obtained by forming a substantially homogeneous mixture of animal or vegetable protein nutritional material, one or more fatty acids, suitably in liquid form, and a calcium or magnesium compound capable of forming an edible water-insoluble salt with the fatty acid under the conditions employed, initiating reaction of the fatty acid(s) and calcium or magnesium compound, suitably by raising the temperature of the ingredients e.g. by injection of steam into the substantially homogeneous mixture formed, maintaining the mixture at elevated temperature, e.g. 110° to 115° C., and then cooling the product. The process has the further advantage that any mycotoxins present in the nutritional material are substantially detoxified by the combined action of the high temperature and the fatty acid and base, e.g. calcium oxide, preferably used.

13 Claims, 1 Drawing Sheet

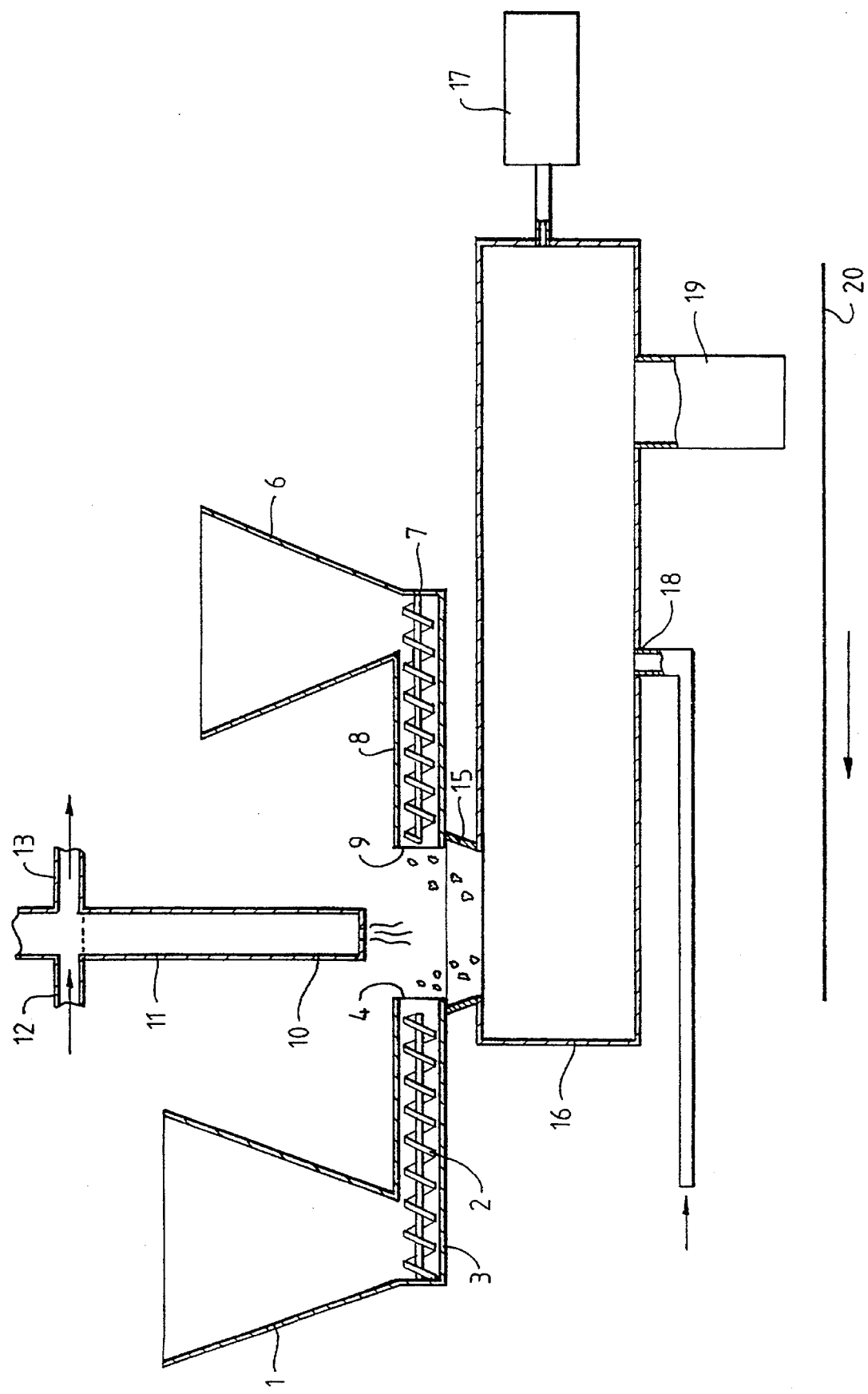

RUMINANT FEEDSTUFFS AND THEIR PRODUCTION

This is a continuation, of application Ser. No. 08/089,563, filed Jul. 12, 1993, now abandoned, which is a CIP of Ser. No. 07/924,493, filed Aug. 4, 1992.

This invention relates to ruminant feedstuffs and to their production.

While the processes of fermentation and digestion which take place in the rumen of ruminant animals are largely beneficial to such animals under natural feeding conditions, modern husbandry may require that, for optimum production of meat and/or milk, such animals should be fed a proportion of their dietary requirements in the form of nutrients which ideally should not undergo alteration or degradation in the rumen but be digested in the lower gut. Also it is necessary that such nutrients should not interfere with the normal processes of rumen fermentation.

In the case of protein metabolism, it is known that at certain times during the period of growth and development, and subsequent lactation in the case of a high-yielding dairy cow, the rumen is not capable of producing sufficient microbial protein to meet the animal's full requirements for maximum growth or maximum production of milk. It is therefore desirable that a proportion of the animal's protein requirement be met by supplying a supplement containing protein which is not degraded in, and thus passes through, the rumen. This can result in an improvement in feed conversion efficiency, growth rate and production as compared with the use of an equal weight of degradable protein, which degradable protein does not bypass the rumen.

Further it is beneficial to feed ruminant animals, in particular cows, with quantities of fat, particularly to maximise milk production. However if excess free fat or free fatty acids are added to the feed, the free fat or free fatty acids can physically coat fibrous or cellulosic material in the rumen and thus prevent it from being broken down by the rumen micro-organisms. This can have an adverse effect on the total digestibility of the diet and result in a reduced yield of milk and/or butter fat. Further, excess free fatty acids and especially some unsaturated fatty acids are toxic to certain micro-organisms in the rumen and this too can have an adverse effect on the total digestibility of the diet. In addition, under normal conditions, unsaturated fats fed to ruminant animals are hydrogenated in the rumen with the result that it is difficult to produce milk containing a high proportion of unsaturated fats. The production of milk containing increased amounts of unsaturated fat thus requires that the fat be protected from normal rumen processes.

GB-PS 2113521 describes ruminant feedstuffs comprising animal or vegetable protein nutritional material dispersed in an edible, water-insoluble calcium or magnesium salt of a fatty acid, the said salt constituting 50 to 80% of the feedstuff. In such feedstuffs the nutritional material is dispersed in the edible water-insoluble fatty acid salt or salts. At the level of acidity or pH range normally found in the rumen, the fatty acid salt is insoluble, and thus it passes substantially unaltered through the rumen to the relatively acidic conditions of the abomasum and small intestine, where the salt is converted to the free acid and mineral ion which can then be utilised. This feedstuff can be obtained by forming a dispersion of the protein material in an aqueous solution of a water-soluble salt of the fatty acid and then adding an aqueous solution of a compound comprising a calcium or magnesium cation which forms a water-insoluble salt with the fatty acid so that an edible water-insoluble fatty acid is precipitated on the dispersed animal or vegetable protein. Alternatively the animal or vegetable protein may be dispersed in the fatty acid salt while the latter is in the molten state and then the mixture is allowed to cool.

U.S. Pat. No. 4826694 describes a dry friable, easy-to-handle, ruminant feedstuff comprising edible water-insoluble calcium or magnesium salt of fatty acid, extractable triglycerides and edible calcium or magnesium oxide. This feedstuff is produced by forming a mixture of basic oxide such as calcium oxide, fatty acid and triglycerides and water and allowing the oxide to react with the acid to form the water-insoluble salt. There is also described such a feedstuff containing up to 65% by weight of proteinaceous nutritional material.

Although the added fatty acid in the feedstuffs of GB-PS 2113521 and U.S. Pat. No. 4826694 is in a form substantially unaltered in the rumen, the protein in the feedstuff of GB-PS 2113521 and any protein in the product of U.S. Pat. No. 4,826,694 is substantially in its native or unprocessed state and any protection of the protein within the rumen is provided by the presence of the water-insoluble fatty acid salt. Although elevated temperatures occur in the production of these products, for example as a result of the exothermic formation of the fatty acid salt, the conditions are not such as to allow the rumen degradability of the protein material to be substantially affected. Accordingly these processes are not suitable for producing rumen-bypass protein.

According to the present invention there is provided a ruminant feedstuff which comprises, in admixture, one or more edible, water-insoluble calcium or magnesium salts of one or more saturated or unsaturated fatty acids, and animal or vegetable protein nutritional material, the protein nutritional material having been converted during formation of the fatty acid salt, e.g. by interacting fatty acid and calcium or magnesium compound, into a form which is substantially non-degradable in the rumen but which is digestible in the lower gut.

The animal or vegetable protein material contained within the feedstuff according to the present invention is of improved non-degradability and by-passes the rumen with substantially reduced loss of protein within the rumen compared to that shown by the animal/vegetable protein when in its native or unprocessed state. Moreover, the protein material in the feedstuff according to the present invention is digested in the lower gut with a high level of efficiency, for example not less than 60% and preferably better than 75% digestible.

By the term "substantially non-degradable in the rumen" is to be understood that less than 50%, preferably less than 30%, of nitrogen in the feedstuff is lost from a sample of the feedstuff suspended in a bag, e.g. Dacron bag, in the rumen for 16 hours. [Dacron is a trade mark.]

The feedstuff according to the present invention cannot be obtained by simple mixing. The conditions of processing of the ingredients are important and must be such as to render the protein material substantially rumen non-degradable on the one hand but, on the other hand, must not be so severe as to render it also lower gut non-digestible. For example excessive heat treatment can render proteins both rumen-non-degradable and lower gut non-digestible (Wilson PN and Strachan PJ, Undegradable protein and the protein requirement of dairy cows, Recent Advances in Animal Nutrition 1980, Butterworths). The processing conditions will of course vary according to the amount and type of protein material being processed.

The feedstuff according to the present invention usually is in particulate form and comprises a substantially homogenous mixture of the ingredients.

The proportions of the ingredients in the feedstuff can be adjusted to satisfy or meet the energy and protein requirements of the animals to be fed. Generally the feedstuff will contain at least 30% by weight protein material and up to 70% by weight calcium or magnesium fatty acid salt. For example the feedstuff may contain 30 to 90% by weight, preferably 40 to 75%, alternatively 55 to 80% by weight, protein material and, respectively, 70 to 10%, 60 to 25% or 45 to 25% by weight fatty acid salt.

The feedstuff according to the present invention may contain other conventional ingredients, including further ingredients as described in GB-PS 2113521 and U.S. Pat. No. 4,826,694.

The present invention also provides a process for the production of ruminant feedstuff, which process comprises forming a substantially homogeneous mixture of animal or vegetable protein nutritional material, one or more fatty acids and a calcium or magnesium compound capable of forming an edible water-insoluble salt with the fatty acid(s) at elevated temperature such that salt formation is initiated and maintaining the processing conditions until the protein material is rendered substantially rumen non-degradable but digestible in the lower gut, and then cooling the product. This is a particularly convenient production process, in which the calcium or magnesium salt is formed, with the heat of reaction being employed to provide at least part of the conditions required for treatment of the protein material to render it rumen non-degradable.

The process according to the invention may be carried out batchwise using a reactor or, more conveniently, continuously e.g. using a reactor conveyor.

In order to initiate the salt formation, the process ingredients must be raised to elevated temperature. The actual temperature will vary according to the particular fatty acid and calcium or magnesium compound to be reacted but generally a temperature of the order of 50° to 70° C. may be sufficient. Clearly, for a practically useful process, it is important that the initiation is achieved quickly. This may be achieved suitably by injection of steam into the substantially homogeneous mixture formed, preferably together with preheating of one or more of the mixture components. If preheating of the ingredients is to a sufficiently high temperature, then the injection of steam or other addition of water to the system may be unnecessary for adequate initiation. Mechanical friction e.g. extrusion or other heat transfer e.g. thermal screw could be used for preheating.

According to a preferred process according to the present invention, ruminant feedstuff may be obtained by forming a substantially homogeneous mixture of animal or vegetable protein nutritional material, one or more fatty acids, suitably in liquid form, and a calcium or magnesium compound capable of forming an edible water-insoluble salt with the fatty acid(s) under the conditions employed, initiating reaction of the fatty acid(s) and calcium or magnesium compound, suitably by injecting steam into the substantially homogeneous mixture formed, maintaining the mixture at elevated temperature, e.g. 110° to 115° C., until the protein nutritional material is rendered substantially non-degradable in the rumen while remaining digestible in the lower gut, and then cooling the product, which may then if necessary be disintegrated to the desired particle size, and packed.

The process according to the invention may suitably be carried out on apparatus which comprises means for feeding metered amounts of animal or vegetable protein nutritional material, of one or more fatty acids, and of a calcium or magnesium compound to the inlet of a continuously operatable mixer, means for injecting steam into the mixer downstream from the inlet, an outlet for discharge of mixture from the mixer, and a conveyor mounted below said outlet.

The animal or vegetable protein nutritional material used according to the present invention is preferably a good quality animal or vegetable protein. Examples of such nutritional materials are grass meal, lucerne meal, field beans, peas, lupin seed, coconut meal, cottonseed, groundnut, linseed, palm kernel, soya bean, sunflower seed, rape seed, fish meal, meat and bone meal, skimmed milk, whey protein, distillers' by-products, barley, maize, oats, rye, rice, gluten meal, locust bean, canola, feather meal, sorghum, safflower seed, single cell protein, and yeast, all of which are suitable for feeding to ruminants to improve the quality of their protein intake. Such materials may be ground as necessary before inclusion in the feedstuffs according to the present invention. It will be understood that references to seed, kernel and fruit nutritional materials include references to corresponding meals (which may be defatted) made therefrom, e.g. rapeseed and soya bean meals.

When oleaginous protein material is employed, e.g. full fat seeds, then it is possible that, under the conditions of treatment, the oil or fat contained therein may be converted, at least partly, into free fatty acids which, in turn, will react with the calcium or magnesium compound resulting in the presence of additional fatty acid salt in the feedstuff.

The fatty acids used in the invention are edible, saturated or unsaturated fatty acids suitably containing 14, 16, 18 and 20 carbon atoms per molecule, preferably myristic acid, palmitic acid, stearic acid, oleic acid, linoleic acid or linolenic acid. However higher and lower carbon content acids may also be used such as lauric and arachidic. It is normally preferred to use a naturally occurring mixture of such fatty acids derived for example from beef or mutton tallow, lard, palm oil, rapeseed oil, olive oil, soya bean oil or groundnut oil. Such materials are produced as by-products of edible oil refining.

Calcium oxide is the preferred basic oxide for use in the process according to the present invention but magnesium oxide may also be used. Burnt (calcined) limestone is a suitable commercial source of lime. It usually contains 94 to 96% CaO and not more than 7% (usually 3 to 5%) of $CaCO_3$. Calcined magnesite is a suitable source of magnesium oxide. If desired calcium oxide and magnesium oxide can be used in admixture.

The exothermic heat generated in the process according to the present invention under the alkaline reaction conditions may also be sufficient very significantly to detoxify any feed or food mycotoxins which may be present; e.g. aflatoxin-contaminated protein meals are substantially detoxified. Thus, it is a particular advantage of the present invention that, when the starting protein material contains mycotoxins, the protein material may be detoxified under the processing conditions and accordingly that no separate detoxification step is required.

The invention also includes within its scope a method for detoxifying a nutritional material, especially one of those mentioned above, which may contain a mycotoxin, which comprises subjecting said feedstuff to a temperature in the range 105° to 120° C. in the presence of interacting fatty acid and calcium or magnesium-containing base. Preferably the nutritional material is maintained at about 110° C. to 115° C. in the presence of reacting calcium oxide and fatty acid for a sufficient time to bring about the desired detoxification; a period of 20 to 90 minutes at 105° to 120° C. is generally enough.

The invention is further illustrated, by way of example, in the accompanying drawing in which there is shown diagrammatically in cross-section apparatus for use in the manufacture of feedstuff.

The apparatus shown in the drawing comprises a first hopper 1 for protein meal or concentrate, in granular form, which is to be incorporated into the feedstuff according to the present invention. At its base, hopper 1 is provided with a screw feed 2 in a duct 3, whereby the granular protein meal or concentrate from hopper 1 is forwarded by means of the screw feed 2 along duct 3 and discharged, in metered amount, from the open end 4 of duct 3. Similarly there is provided a second hopper 6 for compound comprising a calcium or magnesium cation which forms a water-insoluble salt with the fatty acid used. Suitably the compound in hopper 6 is pulverised calcium oxide. Second hopper 6 is provided with a screw feed 7 in duct 8. Accordingly, in similar manner to that for hopper 1, material from hopper 6 may be fed along duct 8 by means of screw feed 7 and discharged in metered amounts from open end 9.

Instead of hopper 1 there may alternatively be employed an extruder or thermal screw or other heat transfer to impart heat to the protein material.

Additionally there is provided a fixed head orifice 10 for the fatty acid or fatty acid mixture to be used in the manufacture of the feedstuff. The fixed head 11 above the orifice 10 is maintained by means of addition of fatty acid at inlet 12 and overflow 13 above the fixed head.

Hoppers 1 and 6 and fixed head orifice 10 are all positioned such that the discharge open ends 4 and 9 from the hoppers and the orifice 10 are above the inlet 15 of a high speed, in line, continuous mixer 16. The high speed mixer 16 is driven by drive 17.

Downstream from the inlet 15 there is injected into the mixer 16 steam via a steam inlet point 18.

Further downstream in the mixer 16 there is provided a discharge chute 19 whereby the contents from the mixer are discharged onto a conveyer 20 which travels in the direction indicated by the arrow.

In use of the apparatus, the fatty acid or fatty acid mixture, suitably comprising essentially of C14, C16, C18 and C20 fatty acids at generally 80° C. to 130° C., preferably about 110° C., is metered via orifice 10 into the high speed continuous mixer 16. Simultaneously protein meal or concentrate and calcium (or magnesium) oxide are fed in the desired amounts from hoppers 1 and 6 to open discharge ends 4 and 9 respectively and into the inlet 15 of high speed continuous mixer 16.

Suitably the ingredients are fed to the inlet of mixer 16 in the following proportions:

Protein meal or concentrate: 30 to 90%, preferably 55 to 80% or 40 to 75%

Fatty acid or fatty acid mixture: 8.5 to 60.9%, preferably 17 to 39% or 22 to 50%

Calcium oxide: 1.5 to 9.1%, preferably 3 to 6% or 3 to 10%

The percentages given are by weight.

The ingredients are mixed within high speed continuous mixer 16. The mixer 16 is operated at a shear rate of 500 to 2000 rpm, preferably about 1000 rpm.

Downstream from inlet 15 steam is injected into the mixture at steam inlet point 18. The steam has the dual function of raising the temperature of the mixture while at the same time initiating the salt formation reaction between the fatty acid(s) and the calcium or magnesium compound. The steam is suitably injected at 241–801 kPa (1.4–7.0 gauge pressure bar), e.g. 376 kPa (2.75 gauge pressure bar), at a temperature of 126° to 170° C., e.g. 141° C. Water is generally not separately added, although the starting materials will usually have a water content. Suitably the amount of water present (as steam, within the starting material and any added water) is 4 to 18%.

Where the protein nutritional material is preheated, for example, by extrusion, steam injection may not be necessary.

The thoroughly mixed matrix is discharged from mixer 16 via discharge chute 19 onto the slowly moving conveyor 20. The temperature of the discharged mixture is generally in the region of 60° to 100° C., suitably about 80° C. On the slowly moving conveyor salt formation takes place and the associated exotherm causes the temperature of the mass to increase, generally to between 105° to 120° C., suitably about 110° to 115° C. The mixture should not be spread out on the conveyor but retained in a compact mass on the conveyor in order to minimise heat loss through evolution of steam and delay cooling for the required processing period.

The product is retained on the conveyor 20 suitably for 20 to 90 minutes, generally 35 to 60 minutes, preferably 45 minutes or such further period of time as is needed to achieve the required rumen undegradability in the final product. The product from conveyor 20 is cooled, disintegrated and/or pelleted, and packed.

The exposure of the protein meal or concentrate to the heat released under the salt formation conditions during the preparation of the feedstuff according to the present invention substantially reduces the degradability of the protein in the rumen such that less than 50% of the protein is lost in the rumen but leaves the protein in a condition digestible in the lower gut. Moreover, the conditions of the process are sufficient very significantly to detoxify any feed or food mycotoxins which may be present; e.g. aflatoxin-contaminated protein meals are substantially detoxified. The use of base (lime) in the salt formation, in combination with the steam and the heat of the ensuing exotherm is believed to bring about this detoxification.

The invention is further illustrated in the following Example.

EXAMPLE

Using apparatus as illustrated in the accompanying drawing, there are introduced into the mixer 16, rapeseed meal from hopper 1, a fatty acid mixture derived from tallow oil, preheated to a temperature of 110° C., via orifice 10, and granular lime from hopper 6. The ingredients were fed to the mixer in the following proportions:

Rapeseed meal—61.5%

Fatty acid mixture—33%

Lime—5.5%

The percentages are by weight.

Within mixer 16, the ingredients are mixed with the mixer being operated at a shear rate of 1000 rpm. Downstream from the inlet 15 of mixer 16, steam, at 376 kPa and 141° C., is introduced.

The thoroughly mixed mixture is discharged from mixer 16 at approximately 80° C. via discharge chute 19 onto the slowly moving conveyor 20. The mixture is discharged onto the conveyor in a compact mass with a view to minimising heat loss. The salt formation reaction ensues within the mass on the conveyor and the temperature of the mass increases to 110° to 115° C. The mixture is retained at this temperature for about 50 minutes, the time being sufficient under the conditions on the conveyor to render the rapeseed meal substantially non-degradable in the rumen while remaining digestible in the lower gut. Also under these conditions any mycotoxins in the starting meal are substantially destroyed.

The product is then removed from the conveyor, cooled, disintegrated and/or pelleted, and packed.

I claim:

1. A process for the production of a ruminant feedstuff which process comprises continuously forming on a moving conveyor a compact mass of a substantially homogeneous mixture of animal or vegetable protein nutritional material, one or more fatty acid(s) and a basic calcium or magnesium salt capable of forming an edible, water-insoluble salt with the fatty acid(s) at an elevated temperature sufficient to initiate salt formation, maintaining the temperature processing conditions in the range of 105° to 120° C. in the compact mass on the moving conveyor until the protein nutritional material is rendered substantially non-degradable in the rumen while remaining digestible in the lower gut, and then cooling the product; wherein the compact mass has a water content of 4–18% during the salt formation reaction period.

2. A ruminant feedstuff which comprises, in admixture, one or more edible, water-insoluble calcium or magnesium salts of one or more saturated or unsaturated fatty acids, and animal or vegetable protein nutritional material, the protein nutritional material having been converted during formation of the fatty acid salt into a form which is substantially non-degradable in the rumen but which is digestible in the lower gut; wherein the ruminant feedstuff product is produced by a continuous process in accordance with claim 1.

3. A feedstuff according to claim 2 wherein the protein material used is one or more of grass meal, lucerne meal, field beans, peas, lupin seed, coconut meal, cottonseed, groundnut, linseed, palm kernel, soya bean, sunflower seed, rape seed, fish meal, meat and bone meal, skimmed milk, whey protein, distillers' by-products, barley, maize, oats, rye, rice, gluten meal, locust bean, canola, feather meal, sorghum, safflower seed, single cell protein, and yeast.

4. A feedstuff according to claim 2 wherein the fatty acid salt comprises a salt of one or more of lauric acid, myristic acid, palmitic acid, stearic acid, oleic acid, linoleic acid, linolenic acid or arachidic acid.

5. A feedstuff according to claim 2 which comprises 30% to 90% by weight protein nutritional material and 10 to 70% by weight calcium or magnesium fatty acid salt.

6. A feedstuff according to claim 5 which comprises 40% to 75% by weight protein nutritional material and 60% to 25% by weight fatty acid salt.

7. A process according to claim 1 which process comprises forming a substantially homogeneous mixture of animal or vegetable protein nutritional material, one or more fatty acids and a calcium or magnesium compound capable of forming an edible water-insoluble salt with the fatty acid(s) under the conditions employed, injecting steam into the substantially homogeneous mixture to initiate salt formation and further mixing the ingredients, maintaining the mixture at elevated temperature, and then cooling the product.

8. A process according to claim 1 which process comprises forming a substantially homogeneous mixture of animal or vegetable protein nutritional material, one or more fatty acids and a calcium or magnesium compound capable of forming an edible water-insoluble salt with the fatty acid(s) under the conditions employed, initiating salt formation and maintaining the mixture at 110° to 115° C. and then cooling the product.

9. A process according to claim 1 in which process one or more of the starting materials is preheated prior to mixing, the preheating of the ingredients being sufficient to initiate the salt formation reaction without additional heating or introduction of water or steam.

10. A process according to claim 1 wherein the nutritional material is one or more of grass meal, lucerne meal, field beans, peas, lupin seed, coconut meal, cottonseed, groundnut, linseed, palm kernel, soya bean, sunflower seed, rape seed, fish meal, meat and bone meal, skimmed milk, whey protein, distillers' by-products, barley, maize, oats, rye, rice, gluten meal, locust bean, canola, feather meal, sorghum, safflower seed, single cell protein, and yeast.

11. A process according to claim 1 wherein the fatty acid is one or more of lauric acid, myristic acid, palmitic acid, stearic acid, oleic acid, linoleic acid, linolenic acid or arachidic acid.

12. A process according to claim 1 wherein the calcium compound used is calcium oxide.

13. A process according to claim 1 wherein the proportions (by weight) of the ingredients used are as follows:

Nutritional material: 30 to 90%

Fatty acid(s): 8.5 to 60.9%

Calcium oxide: 1.5 to 9.1%.

\* \* \* \* \*